(12) United States Patent
Jacobs et al.

(10) Patent No.: US 6,785,769 B1
(45) Date of Patent: Aug. 31, 2004

(54) MULTI-VERSION DATA CACHING

(75) Inventors: Lawrence Jacobs, Redwood City, CA (US); Xiang Liu, San Mateo, CA (US); Shehzaad Nakhoda, Palo Alto, CA (US); Zheng Zeng, Foster City, CA (US); Rajiv Mishra, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 275 days.

(21) Appl. No.: 09/923,073

(22) Filed: Aug. 4, 2001

(51) Int. Cl.[7] ............................................... G06F 12/00

(52) U.S. Cl. ...................... 711/118; 711/133; 711/146; 709/203; 709/232

(58) Field of Search .......................... 711/118, 133, 711/146; 707/3; 709/203, 225, 229, 232

(56) References Cited

U.S. PATENT DOCUMENTS

| | | | |
|---|---|---|---|
| 5,611,049 A | | 3/1997 | Pitts .............................. 707/8 |
| 5,931,904 A | | 8/1999 | Banga et al. |
| 6,029,175 A | | 2/2000 | Chow et al. ................. 707/104 |
| 6,085,234 A | * | 7/2000 | Pitts et al. ................... 709/217 |
| 6,112,278 A | * | 8/2000 | Ellis et al. ................... 711/118 |
| 6,138,141 A | * | 10/2000 | DeSimone et al. ......... 709/203 |
| 6,209,003 B1 | * | 3/2001 | Mattis et al. ............... 707/206 |
| 6,292,880 B1 | * | 9/2001 | Mattis et al. ............... 711/216 |
| 6,360,249 B1 | | 3/2002 | Courts et al. |
| 6,389,460 B1 | * | 5/2002 | Stewart et al. .............. 709/217 |
| 6,507,891 B1 | | 1/2003 | Challenger et al. |
| 6,542,964 B1 | * | 4/2003 | Scharber ..................... 711/122 |
| 6,553,411 B1 | | 4/2003 | Dias et al. |
| 6,640,240 B1 | * | 10/2003 | Hoffman et al. ............ 709/203 |

OTHER PUBLICATIONS

Candan, et al., Enabling Dynamic Content Caching for Database–Driven Web Sites. ACM SIGMOD May 21–24, 2000, Santa Barbara, CA, Copyright 2001 ACM.

Challenger, et al., A Scalable System for Consistently Caching Dynamic Web Data. IBM Research, Yorktown Heights, NY.

Challenger, et al., A Publishing System for Efficiently Creating Dynamic Web Content. IBM Research, Yorktown Heights, NY.

Datta, et al., A Comparative Study of Alternative Middle Tier Caching Solutions to Support Dynamic Web Content Acceleration. Proceedings of the 27th VLDB Conference, Roma, Italy, 2001.

Degenaro, et al., A Middleware System Which Intelligently Caches Query Results. IBM Research, Yorktown Heights, NY, Copyright 2000, Springer–Verlag.

(List continued on next page.)

*Primary Examiner*—Pierre M. Vital
(74) *Attorney, Agent, or Firm*—Park, Vaughan & Fleming LLP (57) ABSTRACT

A system and method for caching multiple versions of a data item (e.g., web page, portion of a web page, data table, data object) and determining which of the multiple versions is most responsive to a particular request. A request is received and an initial cache lookup is done with a data identifier (e.g., URL, URI) extracted from the request. If the lookup is unsuccessful (i.e., nothing is returned), the request is passed to an origin server (e.g., web server, data server). If the lookup is successful, it may provide or identify the desired data item (if one version of the data item is served for all requests) or a policy to be applied to determine which version to serve. The cache applies the policy, which identifies the additional parameters, cookies or other information to be considered, and a second lookup is done with the additional information.

27 Claims, 3 Drawing Sheets

OTHER PUBLICATIONS

Wessels, et al., ICP and the Squid Web Cache, pp. 1–25. Aug. 13, 1997.

Wessels, et al., Internet Cache Protocol (ICP), version 2, pp. 1–9. National Laboratory for Applied Network Research/ UCSD, Sep. 1997.

Akamai white paper: Turbo–Charging Dynamic Web Site with Akamai EdgeSuite, pp. 1–16. www.akamai. com, Sep. 23, 2002. Copyright 2001, Akamai Technologies, Inc.

Edge Sides Includes (ESI) Overview, pp. 1–7. www.esi.org, Sep. 23, 2002. Copyright 2001, Oracle Corporation, Akamai Technologies, Inc.

Tsimelzon, et al., Edge Sides Includes ESI–Accelerating E–Business Applications: Language Specification 1.0, pp. 1–12. www.esi.org/language _spec_1–0.html, Sep. 23, 2002. Copyright 2001, Akamai Technologies, Oracle Corporation.

Nottingham, et al., Edge Side Includes ESI–Accelerating E–Business Applications: Edge Architecture Specification, pp. 1–6. www.esi.org/architecture_spec_1–0.html, Sep. 23, 2002. Copyright 2001, Akamai Technologies, Oracle Corporation.

Jacobs, et al., Edge Side Includes ESI–Accelerating E–Business Applications: ESI Invalidation Protocol 1.0, pp. 1–13. www.esi.org/invalidation protocol 1–0.html, Sep. 23, 2002. Copyright 2001, Oracle Corporation.

Basu, et al., Edge Side Includes ESI–Accelerating E–Business Applications: JESI Tag Library 1.0 Specification: Tags for Edge–Side Includes in JSP, pp. 1–19. www.esi.org/jesit_ tag _lib_1–0.html, Sep. 23, 2002. Copyright 2001, Oracle Corporation, Akamai Technologies, Inc.

* cited by examiner

MULTI-VERSION DATA CACHING

BACKGROUND

This invention relates to the field of computer systems. More particularly, a system and methods are provided for selecting and serving one of multiple versions of a set of data.

In traditional caching systems and methods, one version or copy of a set of data (e.g., a web page, web page component, database object) is typically cached and served in response to all requests for that data. Often, however, different requests may be better served with different versions of the data. The different versions may be in different languages, different protocols or formats (e.g., with frames or without frames), etc. For example, while a native speaker of a particular language may be able to fully enjoy a web page presented in that language, another user having a different native language may not be able to fully appreciate the same version of the web page.

Traditional cache systems generally look at just the data identifier (e.g., URL or Uniform Resource Locator) to identify the set of data to serve. If the cache system stores a set of data matching that identifier, it will serve it, even if a different version of the data is available and may be more responsive. More particularly, traditional cache systems cannot disambiguate a request for a multiversion data item to determine which version is most suitable for the request.

Thus, what is needed is a system and method for selecting and serving, from multiple versions of a set of data, a cached version that is most appropriate for a particular request.

SUMMARY

In one embodiment of the invention a cache system and a method of serving one of multiple versions of a data item are provided. In this embodiment, a request for a data item (e.g., a web page, an object component of a web page, a collection of data) is received at a cache. An initial lookup is performed on the cache using a data identifier extracted from the request. The data identifier may identify the data item with a URL (Uniform Resource Locator), address, file name, etc.

If the initial lookup fails, a cache miss has occurred and the request may be forwarded to an origin server (e.g., web server, data server, application server) for handling. If the initial lookup is successful, it may return either the data item or, if disambiguation of the data request is necessary (i.e., to select one of multiple versions of the data item), a policy identifying additional information needed to select the most responsive of multiple versions of the data. The additional information is retrieved (e.g., from the request, the client, the origin server) and another lookup is performed using that information. If the lookup is successful, the data item is identified, retrieved from cache (if available) and served to the client.

In an embodiment of the invention, the extra information needed to disambiguate a request for a multi-version data item may include one or more cookies or parameters included in the request. Such parameters may identify a user agent (e.g., a browser), a version of a user agent, a country or language (e.g., of the client that submitted the request), etc. A disambiguation policy may be generated with an administrative interface configured to allow an administrator to identify a particular data item or set of data items (e.g., a specific jpeg image, all .html files in a given directory) and specify the additional information needed to select an appropriate version of the data item(s).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In an embodiment of the invention, systems and methods are provided for caching and serving different versions of a given set of data in response to different client requests for the set of data. In this embodiment, a cache receives a data request and searches a cache memory (e.g., a lookup table) using an identifier of the data (e.g., a Uniform Resource Identifier or Locator) provided in the request. If the search returns or identifies a cached data item corresponding to the data identifier, it may be served. However, the search may, instead, return or identify a policy for selecting a particular version or form of the requested data item.

For example, different versions of a data item may be served depending on the particular language, nationality, type of client, user category, or other factor expressed in a data request. Thus, one form of a web page may be served for user agents (e.g., browsers) that are frame-compatible, while another, frameless, form may be served for other user agents. Or one set of product prices may be offered (e.g., at an electronic commerce site) for one type or class of user, while a different set of prices is offered to another type or class of user. Thus, a policy for a multi-version data item may be configured to identify additional information to be used to identify or select an appropriate version.

When the initial search returns a policy, the policy is examined to determine what additional information is needed. That information is then located in the request—as a cookie, a separate parameter, etc.—or retrieved from the client or other source, and another search can then be performed to retrieve or identify the appropriate form or version of the requested data item.

The data cached in an embodiment of the invention may comprise web pages, portions of a web page, data from a database, etc., and may take the form of text, audio, video and so on, which may be formatted according to HTML (Hypertext Markup Language), XML (Extensible Markup Language), or some other language or protocol.

In one embodiment of the invention, a cache may be considered dynamic in that it responds differently to different requests—e.g., based on the request or the requested data. A traditional cache system, by way of contrast, may be considered static in that it acts in the same manner regardless of the form or structure of a request and regardless of the cached or requested data. For example, a traditional cache system may simply examine a data identifier (e.g., Uniform Resource Identifier or Locator) of a data request and serve a cached data item matching the identifier, without determining whether the data item has been restricted for service to particular requests or request formats, whether additional information in the request should be considered in selecting a more appropriate data item, etc. In this embodiment of the invention, however, a cache system receives requests for one set of data or one data item from different clients/user sessions, but the requests may differ in their content or description of the desired data.

Co-pending U.S. patent application Ser. No. 09/923,102 filed Aug. 4, 2001 and entitled "System and Method for Serving One Set of Cached Data for Differing Data Requests" describes methods of serving and/or customizing one set of data for service in response to different data requests, and is hereby incorporated by reference.

Figure 1:
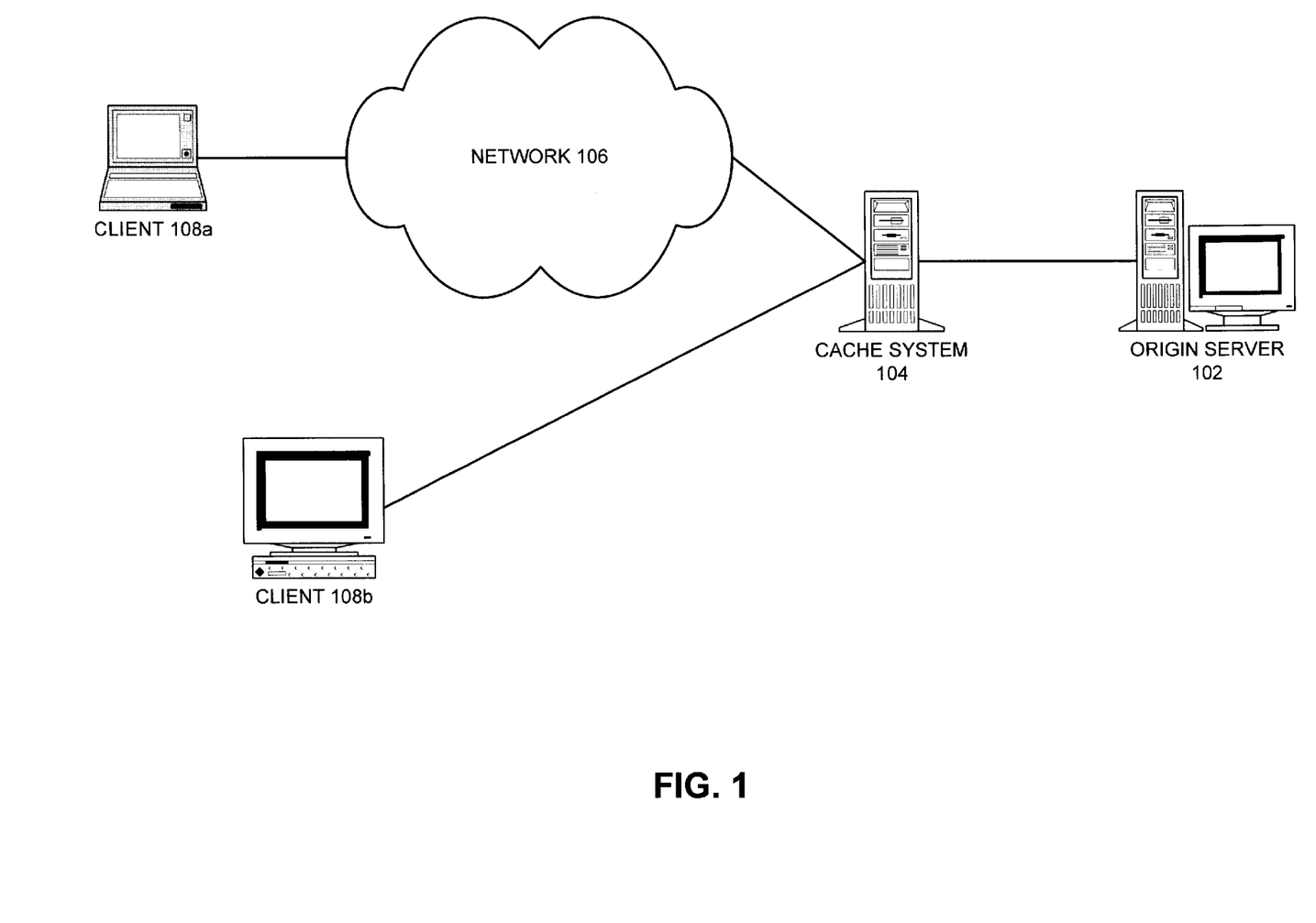
FIG. 1 is a block diagram depicting one data-serving environment in which a cache system may serve different versions of one set of data in response to similar in accordance with an embodiment of the present invention.

FIG. 1 depicts an illustrative computing environment in which an embodiment of the invention may be implemented. Although the illustrated environment includes just one cache system and one data server, embodiments of the invention may be implemented in environments that include multiple caches and/or multiple data servers.

In FIG. 1, origin server 102, which may be a web server, application server, database server, or other server system, stores data that may be served to clients 108a, 108b. Clients 108a, 108b may comprise any type of computing device capable of communication with another computing device. Clients 108a, 108b may therefore comprise desktop, workstation, portable or hand-held devices, or suitably equipped communication devices (e.g., web-enabled telephones). The clients may further, or alternatively, comprise browsers or other user interfaces operated on such computing devices.

Cache system 104 caches data originated by, stored on or maintained by origin server 102, for faster serving to clients. Cache system 104 is coupled to clients 108a, 108b via any suitable communication links, such as network 106 (which may be the Internet) or a direct link. Although origin server 102 and cache system 104 are depicted as separate computers in FIG. 1, in an alternative embodiment of the invention a cache system may reside on the same machine as the origin server, or vice versa. Further, cache system 104 may be implemented as a cache cluster, a partitioned cache, or some other cooperative collection of caches, which may be geographically or logically dispersed within a LAN, WAN or other communication network.

Multi-Version Caching

In one embodiment of the invention, a cache such as cache system 104 of FIG. 1 is configured to serve, or facilitate the service of, different versions of a data item (e.g., web page, image, collection of data) in response to different client requests. Illustratively, each request for the data item may use an identical or similar data identifier (e.g., URI, URL) to identify the desired data. A traditional cache, if employed in this situation, would likely serve the same version of the data item for each request despite the availability of multiple versions. In contrast, a cache provided in this embodiment of the invention may examine any other portion(s) of a request (e.g., cookies, parameters) to determine which version of the data item is most responsive to the request. The cache may also access other information external to the request (e.g., by querying the client or origin server).

Requests for different data items may be disambiguated differently (e.g., using different request parameters). A disambiguation policy may be generated and associated with a data item in order to identify the information to be used to select an appropriate version of the data item. Illustratively, when a data item having multiple versions is stored in the cache, its policy is also stored. And, when a cache search or lookup is done in response to a client request, if the desired data item has a policy, that policy (or an identification or location of the policy) is returned. If no disambiguation is needed (i.e., one form of the data item may be served for all requesters), the search or lookup will return the data item (or an identification or location of the data item). If, of course, nothing is returned in response to the search or lookup, this may constitute a cache miss and the request may be forwarded to the origin server.

The information used to disambiguate a request may comprise virtually any information or parameter. Some examples include: a country designation, a language, a type of user agent (i.e., browser), a version or particular type of user agent, a cookie, etc. A cookie may identify a particular class of user or client, a client session, etc. In an electronic commerce system, for example, a cookie may identify a "level" of user or client (e.g., gold, silver). Depending on a user's level, different product prices may be offered to the user, different user options or services may be available, etc. Thus, when the user connects to the system and requests a home page, or accesses a particular page, the particular version of the requested page that is served by the cache may depend on the client level.

In one embodiment of the invention the cache lookup for a client request may be performed in multiple steps or phases. In particular, because many or most client requests may need no disambiguation (e.g., only one version of the requested data items exist), a first lookup may be performed using just the data identifier of the request (e.g., a URI or URL). If the lookup is unsuccessful or nothing is returned, this may indicate a cache miss. Otherwise, the result of the lookup will comprise (or identify) the desired data item (if no disambiguation is needed) or the policy to be applied to disambiguate the request.

If the search returns or identifies the requested data item, it is served. If it is a policy that is identified, it is applied. In particular, the information needed to select a particular version of the data item is retrieved, and another cache lookup is performed with the additional information. Thus, client requests in which the data identifier is sufficient to identify the desired data item can be handled quickly. And, more complex requests—where additional information or processing is needed for disambiguation—will not be unduly delayed.

In one embodiment of the invention, a cache is configured to store data items at the object level (e.g., separate images, news stories, icons, banners, data sets). Illustratively, even though a client may submit a request for a single page of data, that page may include many separate objects and the one request for the page may spawn requests for each individual object. If most objects in the page are identical for many or all users, it may be more efficient to allow each such item to be retrieved quickly through a simple lookup rather than including multiple parameters in each lookup.

In one alternative method of serving multi-version data items from a cache, a first lookup may employ the data identifier and some or all of the available disambiguating information. For example, a default implementation of this method may use a default set of parameters from a data request (e.g., more than just the data identifier). In another implementation, a policy for the data item may first be retrieved and the disambiguating information specified in the policy may be used to construct an appropriate first lookup. This alternative method of the invention may be well suited for a system in which many or most data requests are for multi-version data items.

Illustratively, a cache according to one embodiment of the invention employs a suitable interface with which an administrator or system manager may specify which data items have multiple versions, submit policies, update or remove policies, etc. For example, such an interface may allow an administrator to specify a data item (e.g., by URL or network address) or a group of data items (e.g., by a pattern such as "page*.html" or "xyzzy.com/images/*.jpg"). The administrator may then specify which additional parameters of a client request, besides the data identifier, are required or desired for disambiguation. Or, the administrator may specify that no additional parameters are required. The interface may also allow the administrator to specify or provide a pattern or rule for determining which version of a data item to serve for which value(s) of the disambiguating information.

Further, a cache lookup table that is searched when a client request is received may be configured for two or more types of entries. For example, a first type of entry, for requests requiring no disambiguation, may comprise or identify the requested data item (with a pointer, file name, URL, etc.). A second type of entry may comprise a tag, marker, indicator or other means of indicating that disambiguation is required before an appropriate version of the requested data item can be served. This type of entry may also comprise or identify the policy to be applied to determine the appropriate version. The policy itself would then specify the parameter(s) or other information to be included in a second lookup. If the second lookup includes all of the necessary information, an instance of the first type of entry should be returned and identify the version of the data item to be served for this request.

Figure 2:
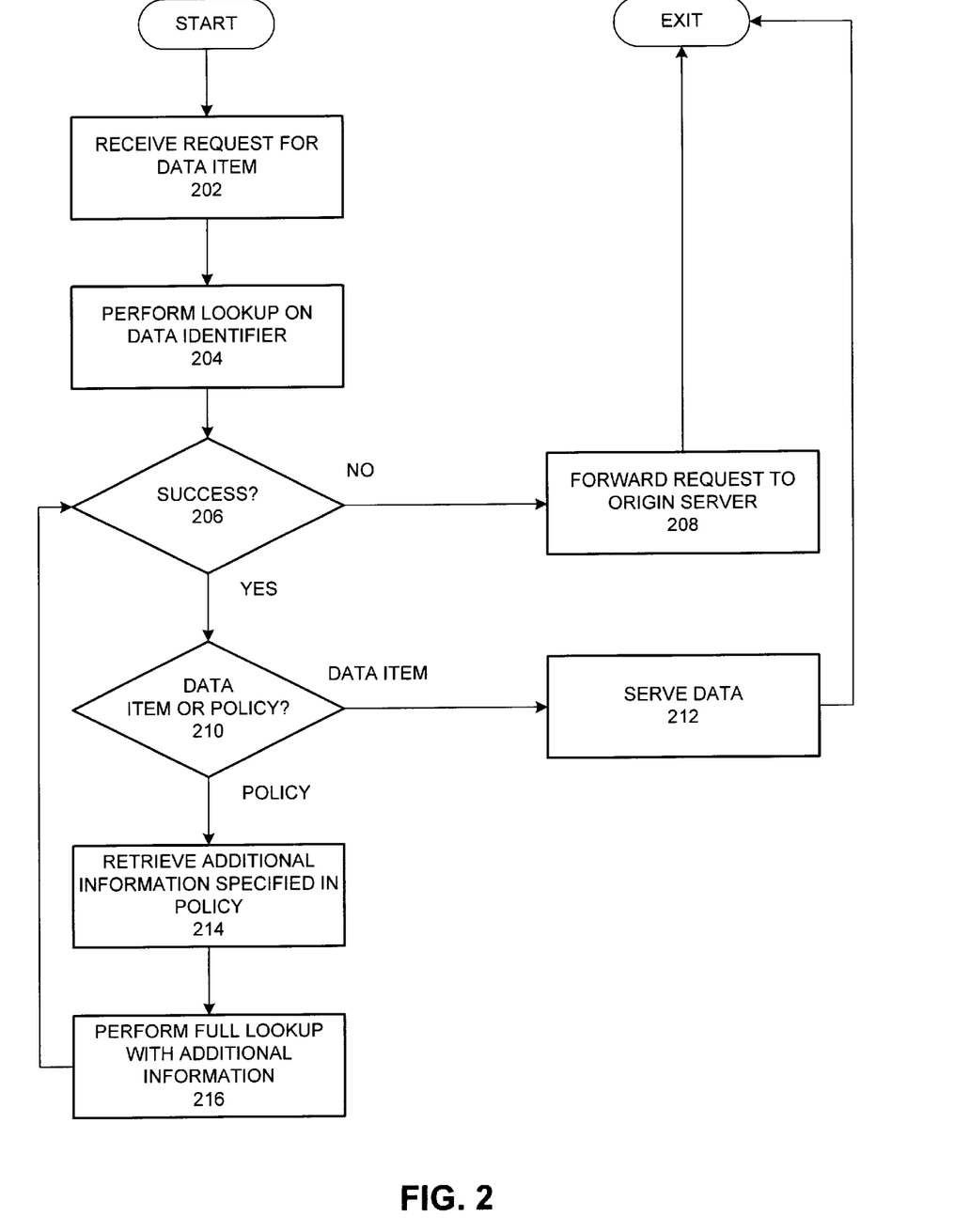
FIG. 2 is a flowchart illustrating one method of identifying and serving one of multiple versions of a requested data item, according to one embodiment of the invention.

FIG. 2 illustrates one method of operating a cache for serving multiple versions of one data item or set of data, according to one embodiment of the invention. A request for a multi-version data item may be disambiguated using any information available in the request and/or other information retrieved from the cache, origin server, client, etc.

In state 202 of the illustrated embodiment, a request is received at the cache from a client. The request may be for a web page, a discrete portion of a web page, a set of data from a database, an image, etc. The request includes a data identifier, in the form of a Uniform Resource Locator (URL), network address, file name or other form, that identifies the basic data item being requested. The data identifier is extracted or copied from the request.

In state 204 a first lookup is performed in the cache, based on the data identifier. This lookup may be performed in a cache lookup table, an index, a cache memory, etc.

In state 206, if the lookup is successful (i.e., a result is returned), the illustrated method of the invention advances to state 210. Otherwise the method continues at state 208.

In state 208, the lookup was unsuccessful, meaning that the cache does not currently store any data items matching the parameters of the search (e.g., the cache has no data items matching the data identifier). Therefore, the request is forwarded to the origin server for satisfaction. If the origin server locates and returns the requested data item or a particular version of the data item, it is served to the client and may also be cached. The method then ends after state 208.

In state 210, the lookup was successful in that some result was returned. However, a successful lookup in this embodiment of the invention may return either the requested data item (or an identifier of, or a pointer to, the data item) or, if disambiguation between multiple versions of the data item is necessary, a policy identifying additional information for selecting the appropriate version (e.g., an identifier of, or a pointer to, the applicable policy). If the lookup returned a policy, then the illustrated method proceeds to state 214; otherwise, the method continues at state 212.

In state 212, the requested data item has been identified and found in the cache and is therefore served from the cache in response to the request. The request has thus been satisfied and the method therefore ends.

In state 214, a policy has been identified for determining which, of multiple versions of the requested data item, is to be served. Therefore, the policy is applied or examined to identify the additional information needed to select the appropriate version. The policy may be stored in the cache or may be retrieved from another location. The additional information specified in the policy is then retrieved—from the request and/or elsewhere (the client, origin server). For example, the policy may specify that a particular cookie or parameter value of the request is needed to determine which version of the data item is most responsive.

In state 216, the additional information is used to construct and execute another lookup in the cache. After state 216, the illustrated method may return to state 206. In summary, however, the second lookup will generally, in this embodiment, return either the data item or nothing. If nothing is returned, a cache miss has occurred and the request is forwarded to the origin server. If the data item is returned (i.e., a particular version of the data item), then it is served. However, in one embodiment of the invention, the second lookup may return another policy, thereby requiring even more information to be retrieved in order to perform yet another lookup.

A Session-Aware Cache

In an embodiment of the invention, a system and method are also provided for caching and serving data without losing any pertinent information desired by an origin server (e.g., web server, data server, database, application server) that originates the data. A cache described in this section may thus be considered to be "session-aware" in that it is configured to provide state transition data, user connection data, user activity and any other information needed by an origin server. Such a cache may thus be added to a traditional data-serving system that tracks or otherwise requires session-specific information. A traditional cache could not be used with this system because it would not capture or protect the session-specific information.

In one embodiment of the invention, a session-aware cache enforces the use of session identifiers by ensuring that designated cached data items are served from the cache only for data requests that include session identifiers. In particular, when a data request is received for a cached data item that has been designated (e.g., by a system administrator, web server, database administrator, origin server), the request is examined or parsed to determine if it includes a session identifier. If so, the data item may be served from the cache. Otherwise, the request may be passed to the origin server for service (and assignment of a session identifier). The session-aware cache in this embodiment captures or protects session-specific information by either passing a request to the origin server (so that the origin server can capture the information), or by gathering the information itself and passing it to the server.

In another embodiment of the invention, a session-aware cache is configured to determine whether a session (e.g., client session, user session) for which it is serving cached data is near its expiration time. Thus, in an environment in which user sessions are configured to expire (e.g., after a set period of inactivity at an origin server), the cache may be configured to pass data requests to the origin server for sessions that are nearing their expirations, even if the requests are for data items that are cached. The origin server may then observe the user's continued activity, and therefore extend the session's lifetime.

Figure 3:
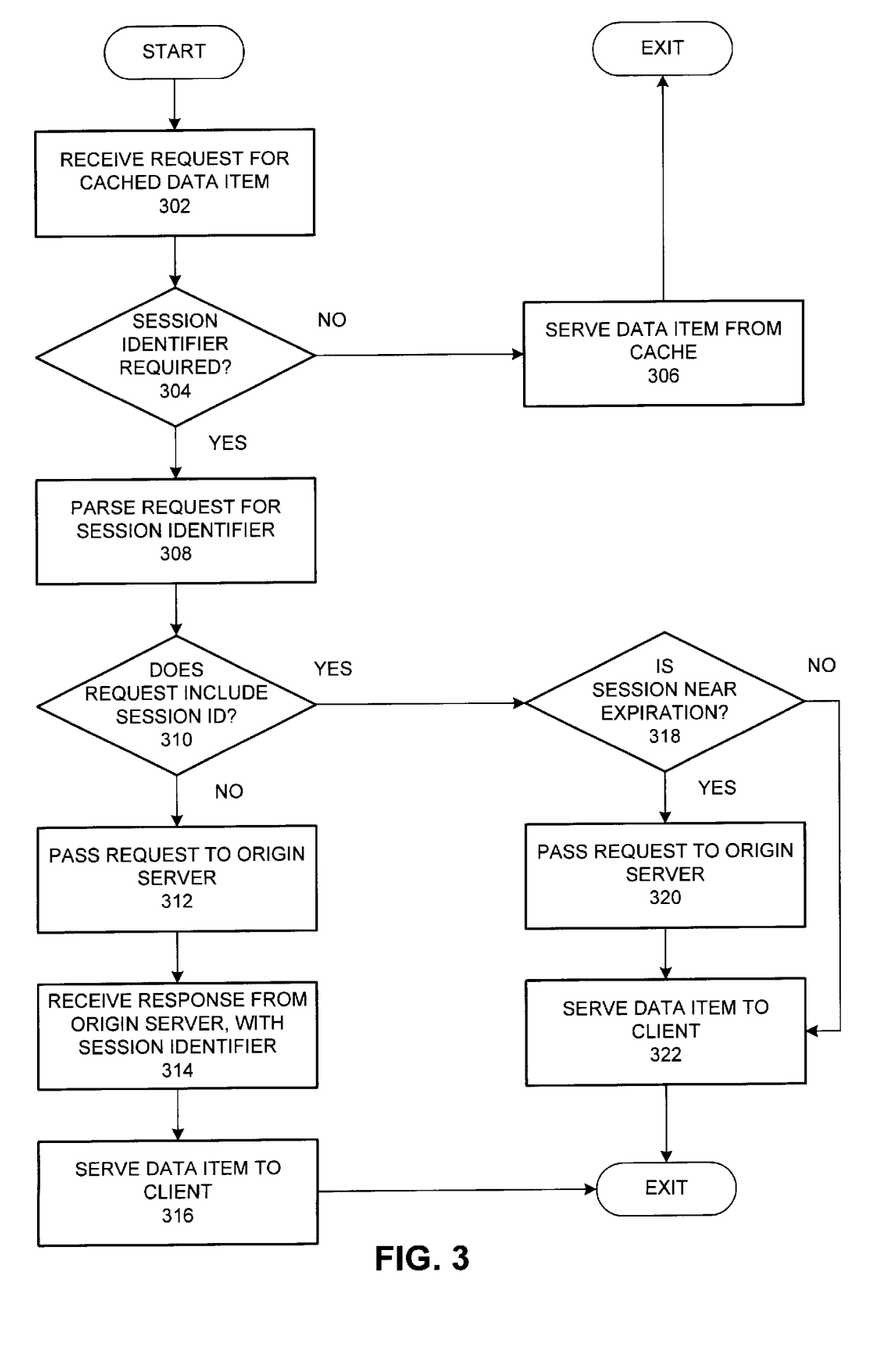
FIG. 3 is a flowchart illustrating one method of serving cached data from a session-aware cache in accordance with an embodiment of the invention.

FIG. 3 demonstrates one method of operating a cache system in a data-serving environment that requires session-specific information, according to one embodiment of the invention. The session-specific information may be required by an origin server in order to tailor service for individual clients (e.g., users, user agents), track client activity, update client accounts, etc.

In the illustrated method, the cache system is configured to examine a data request for specified information, such as a session identifier. In other embodiments of the invention, other information may be examined or searched for, such as a client identifier, a type of user agent or browser, some other request parameter, etc. Further, the cache system is configured to enforce session identification by passing requests that omit session identifiers to the origin server for service (and assignment of a session identifier). In one alternative embodiment, the cache system may be configured to assign a unique session identifier to a client in response to a request that has no session identifier (and notify the origin server of the assigned identifier).

In state 302, a data request is received at the cache system, from a client, for a data item or set of data stored in the cache system. Illustratively, the desired data is identified in the request by a data identifier in the form of a URL (Uniform Resource Locator), network address, etc.

In state 304, the cache system determines whether service of the data item is restricted or limited to registered sessions or requests that include session identifiers. Information indicating that a data item is restricted may be stored at the time the data item is cached, and may take the form of an entry in a table or other data structure, a flag, parameter or other indicator within or associated with the data item, etc. In the illustrated embodiment of the invention, a data item may be restricted by a system administrator, database administrator, web site manager or other entity. In this embodiment the restriction indicator, or information indicating the restricted nature of a data item, may be stored on the cache system or a system coupled to the cache system.

In state 306, service of the data item is not restricted to registered sessions or requests having session identifiers, and so the requested data item is served from the appropriate cache memory and the procedure ends.

In state 308, the cache system parses or examines the request, and/or the description or identifier of the data item, to find a session identifier. Illustratively, a session identifier in this embodiment of the invention may take the form of a cookie (e.g., a parameter of the request), may be embedded within or appended to the data item identifier (e.g., URL), or may be provided in some other form.

In state 310 the cache system determines whether a session identifier was included with the request. If the request does include a session identifier, the method proceeds to state 318; otherwise, the method continues at state 312.

In state 312, the cache system forwards the data request to the origin server, so that the origin server may assign an appropriate session identifier. Illustratively, the cache system also provides the requested data item.

In state 314 the cache system receives a response from the origin server, which includes the requested data item and a newly assigned session identifier. In one alternative of the embodiment, however, if a valid version of the requested data item is stored in the cache system, then the origin server may be configured to only provide a session identifier.

In state 316 the cache system serves the requested data item to the client, along with the session identifier. Illustratively, the assigned session identifier will be returned by the client with any subsequent data requests. The cache system may also cache the version of the data item received from the origin server. The illustrated method then ends.

In one alternative embodiment of the invention, the cache system may be configured to assign session identifiers to a (new) user session in response to the receipt of a data request that does not include a session identifier. Such a session identifier may be returned to the client with the requested data item and may also be passed to the origin server.

In state 318, the data request includes a session identifier and so the cache system may serve the requested data item from cache memory. However, in this embodiment of the invention the cache system is also configured to determine if a user session is near its expiration time. As one skilled in the art will recognize, an origin server may assign lifetimes to new sessions and session identifiers (e.g., thirty minutes). If the session or associated client is inactive (e.g., the origin server receives no requests for the session) for that period of time, the session may be terminated, the session identifier may then be considered invalid and, if a request is later received for that session, a new session (and session identifier) may have to be generated. However, each time the origin server receives a request or other contact from the session during the session's lifetime, the session expiration may be reset or extended. If data requests received from a registered session are continually satisfied by the cache system, without having to forward any to the origin server (i.e., because the cache contains all the requested data), the origin server may erroneously consider the client inactive.

Thus, in state 318 the cache system determines whether the session associated with the data request is approaching its expiration. Various criteria may be used to determine if expiration is "near." For example, the cache system may determine whether the time remaining until expiration is less than a threshold, whether a certain period of the lifetime has elapsed or remains, etc. The cache system may store information regarding the expiration of a session (e.g., if received from the origin server or if the session identifier is generated by the cache system), or the cache system may query the origin server to determine if a session's expiration is near. As another alternative, the cache system may track the amount of time between data requests that it forwards to the origin server for a particular session. Because the origin server will reset the session lifetime for each such request, the cache system may be able to estimate how much of a session's lifetime has elapsed or remains.

If the session is considered near expiration, the illustrated method continues at state 320; otherwise it advances to state 322.

In state 320, the data request is passed to the origin server so that the server can reset the session's expiration.

In state 322, the cache system serves the requested data item to the client. The version of the data item that is served may be the version that was cached or the version received from the origin server in response to the request forwarded in state 320.

In one alternative embodiment of the invention, in states 320–322 the cache system may simply notify the origin server that the specified session was active, instead of forwarding the request to the server. After state 322, the illustrated method ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of serving one of multiple versions of a data item from a cache, comprising:
   receiving at the cache a data request, wherein the requested data is identified by a data identifier;
   searching the cache with said data identifier;
   receiving, in response to said search, a policy for serving said requested data, wherein said policy identifies a parameter of said request other than said data identifier;
   applying said policy to locate in the cache a first version of said requested data corresponding to a value of said parameter included in said data request; and
   serving said first version of said requested data in response to said data request.

2. The method of claim 1, wherein said searching comprises:
   searching a cache lookup table; and
   locating in said table an entry corresponding to said data identifier.

3. The method of claim 2, wherein said receiving comprises:
   retrieving from said entry said policy for serving said requested data.

4. The method of claim 2, wherein said receiving comprises:
   retrieving from said entry a location of said policy for serving said requested data; and
   retrieving said policy.

5. The method of claim 1, wherein said applying comprises:
   extracting from said data request said value of said parameter; and
   searching the cache with said parameter value.

6. The method of claim 1, further comprising, if said search is unsuccessful:
   forwarding said data request to a server configured to produce said requested data;
   receiving from the server one of multiple versions of said requested data; and
   storing said one version in the cache.

7. A method of serving data from a cache, comprising:
   receiving at the cache a request for a data item;
   extracting from said request a first parameter identifying said data item;
   conducting a first search of the cache for said data item with said first parameter;
   if said first search locates said data item in the cache, serving said data item; and
   if said first search identifies a policy for serving said data item:
      extracting from said request a value for a second parameter specified by said policy; and
      conducting a second search of the cache with said second parameter value.

8. The method of claim 7, further comprising:
   if said first search is unsuccessful, retrieving said data item from a server;
   storing said data item in the cache; and
   if a first policy for said data item is received, storing said first policy.

9. The method of claim 7, wherein said first parameter is a Uniform Resource Locator.

10. The method of claim 7, wherein said first parameter is a Uniform Resource Identifier.

11. The method of claim 7, wherein said conducting a first search comprises:
    searching a cache lookup table for said first parameter; and
    receiving an entry in said cache lookup table.

12. The method of claim 11, wherein said entry comprises said data item.

13. The method of claim 11, wherein said entry identifies a location of said data item in the cache.

14. The method of claim 11, wherein said entry comprises a policy for identifying one of multiple versions of said data item.

15. The method of claim 11, wherein said entry identifies a location of a policy for identifying one of multiple versions of said data item.

16. The method of claim 7, wherein said policy specifies information, other than said first parameter, for selecting one of multiple versions of said data item.

17. The method of claim 7, wherein said second parameter is a cookie.

18. The method of claim 7, wherein said second parameter comprises a browser type.

19. The method of claim 7, wherein said second parameter comprises a browser version.

20. The method of claim 7, wherein said second parameter comprises a country identifier.

21. The method of claim 7, wherein said second parameter comprises a language identifier.

22. A computer readable storage medium storing instructions that, when executed by a computer, cause the computer to perform a method of serving one of multiple versions of a data item from a cache, the method comprising:
    receiving at the cache a data request, wherein the requested data is identified by a data identifier;

searching the cache with said data identifier;

receiving, in response to said search, a policy for serving said requested data, wherein said policy identifies a parameter of said request other than said data identifier;

applying said policy to locate in the cache a first version of said requested data corresponding to a value of said parameter included in said data request; and serving said first version of said requested data in response to said data request.

23. A computer readable storage medium storing instructions that, when executed by a computer, cause the computer to perform a method of serving data from a cache, the method comprising:

receiving at the cache a request for a data item;

extracting from said request a first parameter identifying said data item;

conducting a first search of the cache for said data item with said first parameter;

if said first search locates said data item in the cache, serving said data item; and if said first search identifies a policy for serving said data item:

extracting from said request a value for a second parameter specified by said policy; and conducting a second search of the cache with said second parameter value.

24. A cache system, comprising:

storage means configured to cache multiple versions of a first set of data, wherein said first set of data is identifiable by a data identifier;

policy means configured to specify a policy for serving one of said multiple versions of said first set of data in response to a data request; and parsing means configured to parse said data request to retrieve a value for a parameter identified in said policy, wherein said parameter is a parameter other than said data identifier;

wherein said version of said first set of data to be served in response to said data request is determined by said value.

25. The cache system of claim 24, further comprising:

a first search means configured to search the cache system using said data identifier.

26. The cache system of claim 25, further comprising:

a second search means configured to search the cache system using said parameter value.

27. The cache system of claim 24, wherein said data identifier is a Uniform Resource Locator.

* * * * *